(12) United States Patent
Neregård

(10) Patent No.: US 7,151,999 B2
(45) Date of Patent: Dec. 19, 2006

(54) PASSIVE TERRAIN NAVIGATION

(75) Inventor: Fredrik Neregård, Linköping (SE)

(73) Assignee: SAAB AB, Linköping (SE)

( * ) Notice: Subject to any disclaimer, the term of this patent is extended or adjusted under 35 U.S.C. 154(b) by 304 days.

(21) Appl. No.: 10/919,407

(22) Filed: Aug. 17, 2004

(65) Prior Publication Data
US 2005/0080562 A1    Apr. 14, 2005

(30) Foreign Application Priority Data
Aug. 18, 2003    (SE) .................................. 03018549

(51) Int. Cl.
*G01S 1/00*    (2006.01)
(52) U.S. Cl. ...................... 701/214; 213/220; 213/221; 342/358
(58) Field of Classification Search ................ 701/200, 701/207, 213, 214, 216, 220, 221; 342/357.07, 342/358
See application file for complete search history.

(56) References Cited

U.S. PATENT DOCUMENTS

| 6,157,891 | A  | * | 12/2000 | Lin  | ............................ | 701/301 |
| 6,205,400 | B1 |   | 3/2001  | Lin  |                              |         |
| 6,246,960 | B1 | * | 6/2001  | Lin  | ............................ | 701/214 |
| 6,256,559 | B1 |   | 7/2001  | Tsui |                              |         |
| 6,427,122 | B1 | * | 7/2002  | Lin  | ............................ | 701/214 |
| 6,449,559 | B1 |   | 9/2002  | Lin  |                              |         |
| 6,512,976 | B1 | * | 1/2003  | Sabatino et al. | ............. | 701/207 |
| 6,516,272 | B1 | * | 2/2003  | Lin  | ............................ | 701/214 |

OTHER PUBLICATIONS

John E. Pritchett and Alan J. Pue; Robust Guidance and Navigation for Airborne Vehicles Using GPS/Terrain Aiding; pp. 457-463; Position Location and Navigation Symposium, IEEE, 2000.

* cited by examiner

*Primary Examiner*—Gary Chin
(74) *Attorney, Agent, or Firm*—Venable LLP; Eric J. Franklin

(57) ABSTRACT

The present invention relates to terrain navigation wherein an earth-reflected satellite signal is received from at least one reference signal source whose position is known (120), for example a navigation satellite. Based on information contained in the received signal a measured estimate of a shortest reflection distance ($d_1(t_b)$) to the satellite (120) is derived. A relative spatial movement ($\Delta x$, $\Delta y$, $\Delta h$) of a relevant craft (110) since a previous positioning instance ($t_a$) is registered onboard the craft (110). Moreover, stored surface information is retrieved pertaining to an elevation ($h_{1b}$) of the earth surface (130) in relation to the mean sea level ($z_0$) at at least one geographical position ($X_{1b}$, $Y_{1b}$). Based on the relative spatial movement ($\Delta x$, $\Delta y$, $\Delta h$) and the retrieved surface information at least one calculated estimate of the shortest reflection distance ($d_1(t_b)$) to the satellite (120) is derived. Finally, a geographical position ($X_{1a}$, $Y_{1a}$, $h_{1a}$) is determined on basis of the measured and calculated estimates of the shortest reflection distance ($d_1(t_b)$). Thus, a highly reliable and entirely passive positioning may be accomplished on basis of external signals from as few satellites (120) as one.

9 Claims, 3 Drawing Sheets

US 7,151,999 B2

PASSIVE TERRAIN NAVIGATION

THE BACKGROUND OF THE INVENTION AND PRIOR ART

The present invention relates generally to terrain navigation-based on a passive signal reception. More particularly the invention relates to a non signal-emitting terrain navigation arrangement and a terrain navigation method. The invention also relates to a computer program and a computer readable medium.

In the last decades, navigation systems have been developed which facilitate the determination of a position dramatically compared to the earlier known methods. These navigation systems determine positions on basis of accurate radio signals received from a plurality of satellites (at least four), and are commonly referred to as global navigation satellite systems (GNSS:s). There exist several GNSS standards of which the most important examples are GPS (Global Positioning System, run by the U.S. Government), GLONASS (Global Navigation Satellite System, run by the Russian Federation Ministry of Defense) and the Galileo system (the European programme for global navigation services, which offers EGNOS (the European Geostationary Navigation Overlay Service), developed by a collaboration between the European Space Agency and the European Union).

Although the above-mentioned GNSS:s generally provide relatively accurate position information, GNSS-based navigation may become problematic if, for some reason, radio signals cannot be received from a sufficiently large number of satellites during an extended time, say 10 seconds or more. For example, such radio signal outage may occur if the line of sight vectors from the receiver to one or more of the satellites to which the receiver currently is locked are covered by obstacles. The radio signals from the satellites may also be jammed (intentionally or unintentionally) or be spoofed. Therefore., at least in military applications, it is often desirable to integrate the GNSS receiver with an INS (Inertial Measurement System) and a terrain navigation system, such that the systems may aid and support one another. In fact, a GNSS receiver and an INS complement each other quite well due to their fundamental differences.

A GNSS receiver and an INS measure different quantities. Accelerometers, found in inertial sensors, measure specific forces which are translated to a known coordinate frame with the aid of rate gyro derived measurements. Newton's laws of motion are then applied to provide velocity and position information. A GNSS is a radio navigation system. Hence, the GNSS receiver measures satellites-to-user ranges, and from these measurements, a user position and velocity can be derived. Furthermore, GNSS measurements have a long-term stability, however a noisy behavior. INS measurements on the other hand, are only short term stable; but are less noisy than GNSS receivers. Moreover, as mentioned above, since all GNSS:s are radio navigation systems, they are sensitive to external radio frequency disturbances; while an INS is not, since it is an autonomous system. Thus, an integration of a GNSS and an INS promises to combine the best of both worlds.

In terrain navigation, the position is estimated using a terrain database and a sensor for measuring the distance from a craft to the ground together with a sensor for measuring the craft's relative movement. In similarity with GNSS measurements, a terrain navigation system is long-term stabile, however relatively noisy.

Various solutions for combining a GNSS receiver with an INS are already known, for instance through the U.S. Pat. No. 6,449,559. This document describes a fully coupled positioning solution, wherein INS data is integrated with GPS data by means of a Kalman filter. Thereby, a positioning accuracy may be achieved, which is better than what would be possible to attain with a GPS receiver only.

In contrast, the U.S. Pat. No. 6,256,559 describes a purely GPS-based solution for determining a craft's altitude above the ground wherein both a direct signal and an earth-reflected signal from a satellite are measured. Thereby, a reliable passive altimeter is accomplished. However, only altitude measurements are discussed, not positioning.

Hence, the prior art both includes navigation solutions where a GNSS receiver and an INS are combined, and an altimeter solution where earth-reflected satellite signals are registered. However, there is yet no strictly passive navigation solution, which generates reliable position data also under conditions when signals from very few (i.e. less than four) satellites are available.

SUMMARY OF THE INVENTION

The object of the present invention is therefore to provide a passive navigation solution, which alleviates the problem above and thus offers highly reliable position data on basis of external signals from as few satellites as one.

According to one aspect of the invention the object is achieved by a passive terrain navigation arrangement, which includes a radio receiver system, an inertial measurement unit, a terrain database and a processing unit. The radio receiver system is adapted to receive an earth-reflected satellite signal from at least one reference signal source whose position is known, for instance a navigation satellite, an aircraft or a radio basestation. Based on this signal, the radio receiver system derives a measured estimate of a shortest reflection distance to the satellite. The inertial measurement unit is adapted to register a relative spatial movement of the arrangement, and produce at least one signal which reflects this movement. The terrain database contains surface information pertaining to elevations of the earth surface in relation to the mean sea level at given geographical positions. The processing unit is adapted to receive the at least one signal, which reflects the relative spatial movement. The processing unit is also adapted to retrieve surface information from the terrain database. Based on this information and the movement information signal, the processing unit derives at least one calculated estimate of the shortest reflection distance to the at least one reference signal source. The processing unit is further adapted to determine a geographical position on basis of the measured and calculated estimates of the shortest reflection distance. Preferably, a plurality of estimates is calculated, and iteratively, for each estimate a corresponding positioning is performed.

An important advantage attained thereby is that both a relatively high accuracy and a good reliability are accomplished. At the same time, the navigation arrangement is completely silent, i.e. the arrangement does not emit any signals which may reveal it. Therefore, the arrangement is well suited for military applications where, in general, a stealthy operation is desirable.

According to a preferred embodiment of this aspect of the invention, the processing unit is adapted to determine the geographical position on basis of a probability distribution. This distribution describes a probability that the arrangement is located at a specific geographical position provided that a particular measured estimate respective a particular calculated estimate of the shortest reflection distance is derived. Thus, a probabilistic description of the relationship between positions and reflection distances enables the position to be determined. The probabilistic description, in turn, is given by an error function, which expresses the measurement error when deriving the measured estimate of the shortest reflection distance to the satellite (i.e. the distance measure being based on the signal which is received in the radio receiver system). Hence, the probability distribution may either be theoretically assigned or be determined through measurements, and there are no limitations with respect to the statistical model. This vouches both for a high flexibility and a high accuracy.

According to another preferred embodiment of this aspect of the invention, the terrain navigation arrangement includes a barometer-based altimeter, which is adapted to register an altitude measure in relation to the mean sea level. The inertial measurement unit is adapted to receive the altitude measure, and based thereon, calibrate its measurements of the relative altitude movement. Thereby, the relative measurements may be calibrated repetitively without signals from any additional satellites being required. Naturally, this is a desirable feature.

According to another aspect of the invention, the object is achieved by a passive navigation method, which includes the steps of: registering a relative spatial movement; receiving an earth-reflected satellite signal from at least one reference signal source; deriving a measured estimate of a shortest reflection distance to the at least one reference signal source based on the received earth-reflected satellite signal; retrieving surface information pertaining to an elevation of the earth surface in relation to the mean sea level at at least one geographical position; deriving at least one calculated estimate of the shortest reflection distance to the at least one reference signal source based on the relative spatial movement and the surface information; and determining a geographical position based on the measured estimate and the at least one calculated estimate of the shortest reflection distance.

Preferably, the geographical position is determined on basis of a probability distribution, which describes the probability that the arrangement is located at a specific geographical position provided that a particular measured estimate respective a particular calculated estimate of the shortest reflection distance is derived. Moreover, it is preferable to derive the at least one calculated estimate of the shortest reflection distance with respect to at least two tentative geographical positions. A probability is then calculated that the earth-reflected satellite signal was measured at each of said tentative geographical positions. Finally, the geographical position is determined based on a calculated estimate of the shortest reflection distance which is associated with a probability that exceeds a threshold value. A good accuracy may thereby be accomplished.

The advantages of this method are apparent from the discussion hereinabove with reference to the proposed arrangement.

According to a further aspect of the invention the object is achieved by a computer program directly loadable into the internal memory of a computer, comprising software for performing the above proposed method when said program is run on a computer.

According to another aspect of the invention the object is achieved by a computer readable medium, having a program recorded thereon, where the program is to make a computer perform the above-proposed method.

Thereby, the invention offers an excellent navigation tool for critical applications wherein a high accuracy and a high reliability is desired, and at the same time, any signal emission should be minimized.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
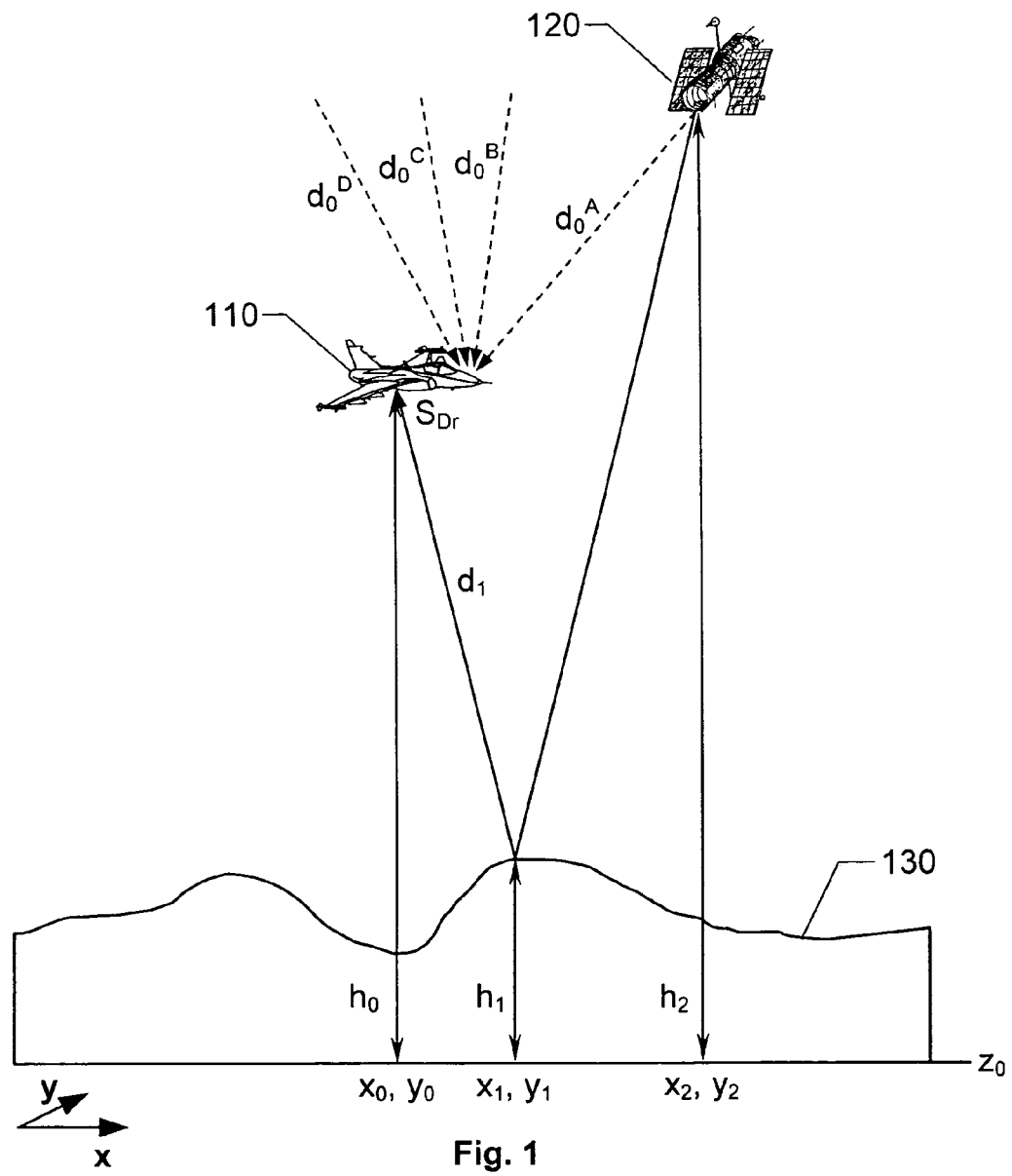
FIG. 1 illustrates the differences between determining the position of a craft by means of a prior-art GNSS receiver and by means of the proposed terrain navigation arrangement, FIG. 2 further illustrates the navigation method according to the invention.

FIG. 1 illustrates both a known navigation method and the navigation method according to the invention. Traditionally, a craft 110 equipped with a GNSS receiver may determine its position $x_0$, $y_0$ and $h_0$ by receiving signals from at least four different navigation satellites in the GNSS. For reasons of a simple presentation, the FIG. 1 only shows one of these satellites 120. Based on the received satellite signals, the GNSS receiver determines a respective distance $d_0^A$, $d_0^B$, $d_0^C$ and $d_0^D$ to each satellite. On further basis of these distances $d_0^A$, $d_0^B$, $d_0^C$, $d_0^D$ and a timing reference, it is then possible to determine the receiver's position by means of triangulation. Namely, the position of each satellite is known and indicated to the GNSS receiver via the respective signals along with a clock signal.

As mentioned above, one or more of the required satellite signals may be prevented from reaching the GNSS receiver in the craft 110. In that case, the craft's 110 position cannot be determined exclusively by means of a standard GNSS receiver. However, according to the invention, an earth-reflected satellite signal $S_{Dr}$ from the navigation satellite 120 is used. Thus, the signal $S_{Dr}$ has not traveled a shortest (line-of-sight) distance $d_0^A$ between the satellite 120 and the craft 110. Instead, the signal $S_{Dr}$ has bounced once against the earth surface 130. Nevertheless, it is presumed that the received signal $S_{Dr}$ has traveled a shortest possible reflection distance $d_1$ from the satellite 120 to the craft 110. This is a rational assumption, since a standard GNSS receiver is typically designed to detect the first received signal in order to suppress any multipath signals. Hence, by locating the antenna of a standard GNSS receiver on a side of the craft 110 which faces towards the general direction of the earth surface 130 an appropriate means is accomplished for receiving the earth-reflected satellite signal $S_{Dr}$, which has traveled a shortest reflection distance from the satellite to the craft 110.

As also mentioned earlier, the satellite's 120 position $x_2$, $y_2$, $h_2$ is known, and this information is forwarded to the navigation arrangement in the craft 110 via the signal $S_{Dr}$. Alternatively, or as a complement, the position information $x_2$, $y_2$, $h_2$ may be forwarded to the craft 110 via a direct signal (line-of-sight) from the satellite 120. It is advantageous to receive both a direct signal and an earth-reflected signal from one and the same satellite, because thereby, by subtracting the direct signal from the earth-reflected signal, it is possible to eliminate the effects of any synchronization error between the clock signal in the satellite 120 and the local clock signal in the navigation arrangement. This, in turn, makes it possible to avoid a systematic altitude error in the calculations.

Moreover, a measured estimate $\hat{d}_1$ of the shortest reflection distance between the satellite 120 and the craft 110 may be derived from the earth-reflected satellite signal $S_{Dr}$. The measured estimate $\hat{d}_1$ can be expressed as:

$$\hat{d}_1 = d_1 + e_1$$

where $d_1$ represents an actual shortest possible reflected distance between the satellite 120 and the craft 110, and $e_1$ represents a measurement error which has a distribution $f_{e_1}(\cdot)$.

The distribution $f_{e_1}(\cdot)$ may either be assigned theoretically, or it may be determined via measurements. The distribution $f_{e_1}(\cdot)$ may be Gaussian, however it may equally well have a different distribution. The measurement error $e_1$ includes at least two separate components, of which a first represents a measurement noise (i.e. distortions of the signals, e.g. caused by the properties of the atmosphere and the earth surface), and a second represents the fact that it may not actually be the signal which has traveled the shortest distance that is received (e.g. because this particular ray has been attenuated too much before reaching the craft 110).

In any case, the actual shortest possible reflected distance $d_1$ between the satellite 120 and the craft 110 is given by a distance expression:

$$d_1 = \min_{x_1, y_1 \in \mathcal{R}^2} \left( \sqrt{(h_2-h_1)^2 + (x_2-x_1)^2 + (y_2-y_1)^2} + \sqrt{(h_1-h_0)^2 + (x_1-x_0)^2 + (y_1-y_0)^2} \right)$$

where $x_0$ and $y_0$ denote the geographical coordinates of the craft 110, $h_0$ represents the craft's 110 altitude above the mean sea level $z_0$, $x_1$ and $y_1$ denote the geographical coordinates of a reflection point where the signal $S_{Dr}$ bounces against the earth surface 130 to travel a shortest reflected distance $d_1$ to the craft 110, $h_1$ is the earth surface's 130 elevation above the mean sea level $z_0$ at the reflection point $x_1$, $y_1$, $x_2$ and $y_2$ denote the geographical coordinates of the satellite 120, and $h_2$ represents the satellite's 120 altitude above the mean sea level $z_0$.

The parameters $x_2$, $y_2$ and $h_2$ are known from the signal $S_{Dr}$ (and/or a direct signal from the satellite 120). A database in the proposed arrangement contains surface information pertaining to the elevation of the earth surface 130 in relation to the mean sea level $z_0$ at a large number of geographical positions, for instance, separated 50 meters from one another. Based on the stored surface information, the parameters $x_1$, $y_1$, and $h_1$ may be derived. In other words, $h_1$ is described by a non-linear function of the $x_1$ and $y_1$ and is given by the stored terrain data. The parameters $x_0$, $y_0$ and $h_0$ represent information, which reflects the current geographical space coordinates of the craft 110.

Figure 2:
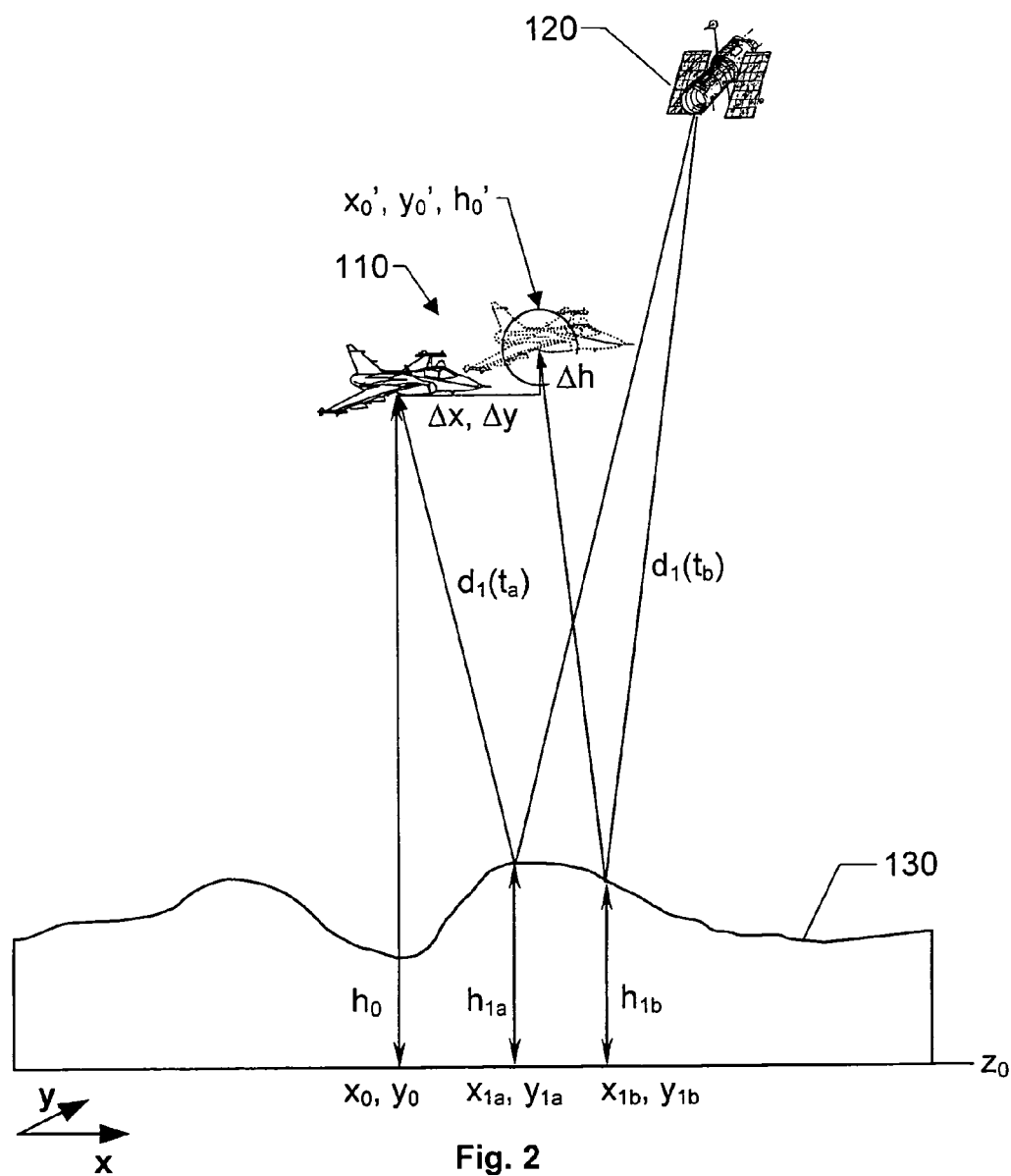

Now, let us regard the positioning problem from another point-of-view. Namely, assume that we do not know the geographical space coordinates $x_0$, $y_0$ and $h_0$ of the craft 110, and further assume that we have a measured estimate $\hat{d}_1$ of the shortest reflection distance between the satellite 120 and the craft 110 (which is given by the received signal $S_{Dr}$). Instead, we now want to calculate a probability $p(x_0, y_0, h_0)$ that the craft 110 is located at a specific geographical position $x_0$, $y_0$, $h_0$. This may be performed by studying the expression:

$$p(x_0, y_0, h_0) = f_{e_1}(\hat{d}_1 - d_1)$$

where the distance $d_1$ is derived by evaluating the above-mentioned distance expression in the coordinates $x_0$, $y_0$, $h_0$. The coordinates $x_0$, $y_0$, $h_0$, in turn, may be derived by registering a relative spatial movement since a previous evaluation was performed. This procedure will be discussed below with reference to the FIG. 2, which shows a craft 110 being located at two different positions. At a first point in time $t_a$, the craft 110 is located at a first position $x_0$, $y_0$, $h_0$. Here, a signal from a navigation satellite 120 travels a shortest reflected distance $d_1(t_a)$ to the craft 110. At a second and somewhat later point in time $t_b$, the craft 110 is located at a second position, and a shortest reflected distance between the satellite 120 and the craft 110 is instead given by $d_1(t_b)$.

An inertial measurement unit in the craft 110 has registered that at the second point in time $t_b$, the craft 110 has moved a distance in space which is represented by a set of relative coordinates $\Delta x$, $\Delta y$ and $\Delta h$ respectively since a previous positioning determination was made at the first point in time $t_a$. Thus, at $t_b$ it is reasonable to assume (at least provisionally) that the craft 110 is located at an estimated position $x_0 + \Delta x$, $y_0 + \Delta y$, $h_0 + \Delta h$. However, due to imperfections in the inertial measurement unit the craft may well be located at a different location, particularly if the time difference between $t_b$ and $t_a$ is relatively large.

Therefore, it is preferable to derive an estimate of the distance d, not only in $x_0 + \Delta x$, $y_0 + \Delta y$, $h_0 + \Delta h$, however also in a number of tentative points in proximity thereto. In the FIG. 2, a volume $x_0'$, $y_0'$, $h_0'$, for instance a sphere or a cube, is illustrated. A plurality of such tentative geographical positions may be selected from this volume $x_0'$, $y_0'$, $h_0'$, which may or may not, have its center at $x_0 + \Delta x$, $y_0 + \Delta y$, $h_0 + \Delta h$. Specific tentative points within the volume $x_0'$, $y_0'$, $h_0'$ may be selected for calculation of a respective probability $p(x_0', y_0', h_0')$ for each point by applying well-known probability based estimation theory, e.g. particle filters, and assuming that the probability distribution is described by a conditional probability function based on Bayes theorem. Further details regarding the principles behind this selection of points can be found in the article Neregård F. et al, "A Real Time, High Integrity, Terrain Navigation System", Svenska Navigeringsdagarna, 24–25 Apr. 2002, Stockholm.

For each selected tentative point within the volume $x_0'$, $y_0'$, $h_0'$ a corresponding probability is calculated that the craft 110 is located in this point. Any probability equal to, or below, a threshold value is disregarded. Thus, the calculations must at least be repeated until one point is found which results in a probability above this threshold value. Naturally, the calculations may also be continued with respect to two or more points being associated with probabilities above the threshold value until a sufficiently high probability is attained that the craft 110 is located at a particular position.

Finally, this position is regarded as the craft's 110 "true" geographical coordinates at the second point in time $t_b$.

Figure 3:
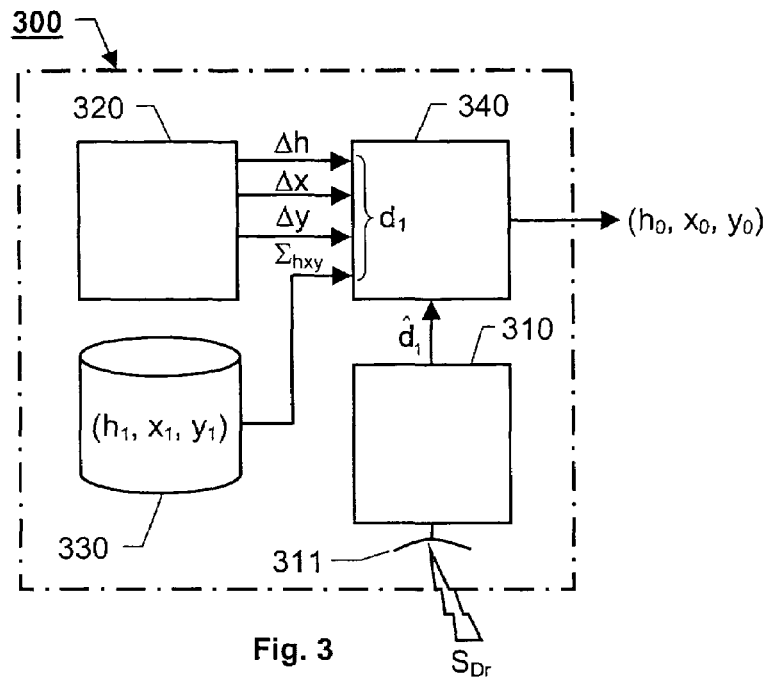
FIG. 3 shows a block diagram over a passive terrain navigation arrangement according to an embodiment of the invention.

FIG. 3 shows a block diagram over a proposed passive terrain navigation arrangement 300. The arrangement 300 includes a radio receiver system 310, an inertial measurement unit 320, a terrain database 330 and a processing unit 340. The radio receiver system 310 is adapted to receive an earth-reflected satellite signal $S_{Dr}$ from at least one navigation satellite, such as 120 in FIG. 2. Based on the signal $S_{Dr}$ the radio receiver system 310 derives a measured estimate $\hat{d}_1$ of a shortest reflection distance to each of the at least one navigation satellite. The inertial measurement unit 320 is adapted to register a relative spatial movement $\Delta x$, $\Delta y$, $\Delta h$ of the arrangement 300. This means that the unit 320 may contain inertial sensors in the form of gyros and accelerometers, which in turn generate one or more signals reflecting the relative spatial movement $\Delta x$, $\Delta y$, $\Delta h$. The terrain database 330 contains surface information $\Sigma_{hxy}$ pertaining to elevations $h_1$ of the earth surface in relation to the mean sea level at given geographical positions $x_1$, $y_1$. As already mentioned, these geographical positions $x_1$, $y_1$ may represented by a box junction pattern of samples at 50 meters separation from one another. However, of course, any alternative sample pattern and separation distance is equally well conceivable.

The processing unit 340 receives the signal(s) reflecting the relative spatial movement information $\Delta x$, $\Delta y$, $\Delta h$ from the inertial measurement unit 320. The processing unit 340 also retrieves surface information $\Sigma_{hxy}$ from the terrain database 330. On basis of the information $\Delta x$, $\Delta y$, $\Delta h$ and $\Sigma_{hxy}$ the processing unit 340 derives a calculated estimate $d_1$ of the shortest reflection distance to the satellite from which the signal $S_{Dr}$ is received. The processing unit 340 also determines a geographical position $h_0$, $x_0$, $y_0$, based on the measured estimate $\hat{d}_1$ and the calculated estimate $d_1$ of the shortest reflection distance according to the procedure described above. Thus, the processing unit 340 is preferably adapted to determine the geographical position $h_0$, $x_0$, $y_0$ on basis of a probability distribution, which describes the probability that the arrangement 300 is located at a specific geographical position $h_0$, $x_0$, $y_0$ provided that a particular measured estimate $\hat{d}_1$ respective a particular calculated estimate $d_1$ of the shortest reflection distance has been derived.

In addition to the above, it is preferable if the arrangement 300 includes a barometer-based altimeter, which is adapted to register an altitude measure $h_0$ in relation to the mean sea level $z_0$. Namely, thereby the inertial measurement unit 320 may calibrate its measurements of the relative altitude movement $\Delta h$ based on the altitude measure $h_0$.

Figure 4:
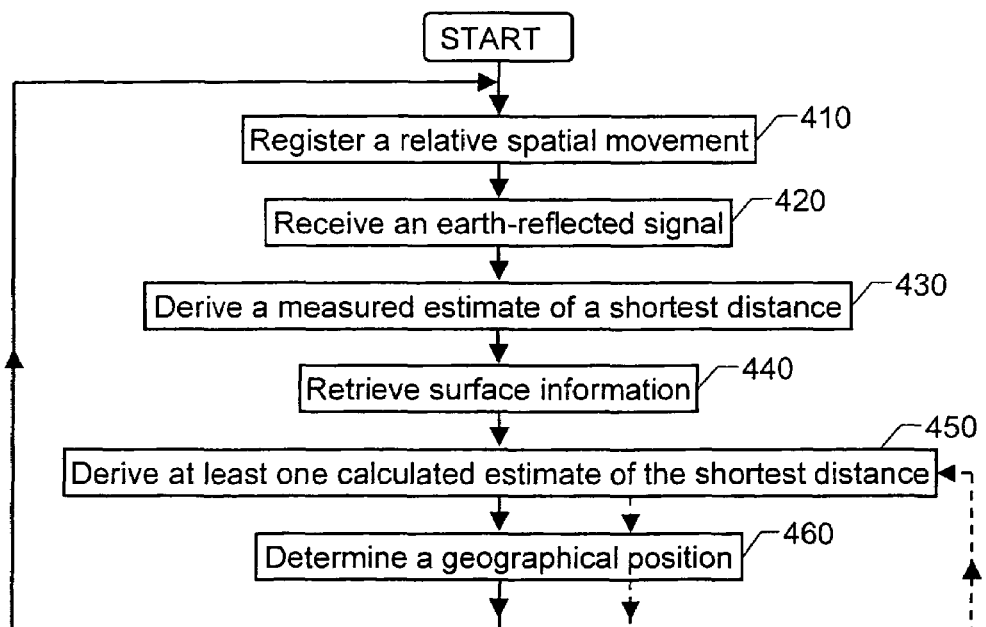
FIG. 4 illustrates, by means of a flow diagram, a general method of navigating according to the invention.

In order to sum up, the general method of navigating according to the invention will now be described with reference to the flow diagram in FIG. 4.

A first step 410 registers a relative spatial movement. Subsequently (or in parallel therewith), a step 420 receives an earth-reflected satellite signal from at least one navigation satellite, for example as illustrated by means of the signal $S_{Dr}$ from the satellite 120 in the FIG. 2. A step 430 then derives a measured estimate of a shortest reflection distance to the at least one navigation satellite from the received signal. After that, a step 440 retrieves surface information pertaining to an elevation of the earth surface in relation to the mean-sea level at at least one geographical position in proximity to a position given by a previously derived position and the registered relative spatial movement. Then, a step 450 derives at least one corresponding calculated estimate of the shortest reflection distance to the at least one navigation satellite based on the relative spatial movement and the surface information. Finally, a step 460 determines an updated geographical position based on the measured estimate and the at least one calculated estimate of the shortest reflection distance to the at least one navigation satellite.

In order to improve the positioning precision it is preferable to repeat the steps 450 and 460 with a plurality of tentative points within a volume around the geographical space coordinate which is given by the registered relative spatial movement. The steps 450 and 460 are repeated (illustrated by means of dashed arrows) until a position estimate has been determined, which has a sufficiently high probability of being correct.

All of the process steps, as well as any sub-sequence of steps, described with reference to the FIG. 4 above may be controlled by means of a programmed computer apparatus, preferably located in the proposed terrain navigation arrangement. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A passive terrain navigation arrangement comprising:
    a radio receiver system adapted to receive an earth-reflected satellite signal from at least one reference signal source whose position is known, and based thereon, derive a measured estimate of a shortest reflection distance to the at least one reference signal source,
    an inertial measurement unit adapted to register a relative spatial movement of the arrangement,
    a terrain database containing surface information pertaining to elevations of the earth surface in relation to the mean sea level at given geographical positions $(x_1, y_1)$, and
    a processing unit adapted to receive at least one signal representing the relative spatial movement retrieve the surface information from the terrain database, and based thereon, derive at least one calculated estimate of the shortest reflection distance to the at least one reference signal source, the processing unit being further adapted to determine a geographical position on a basis of the measured estimate and the at least one calculated estimate.

2. The passive terrain navigation arrangement according to claim 1, wherein the processing unit is adapted to determine the geographical position on basis of a probability distribution which describes a probability that the arrangement is located at a specific geographical position provided that a particular measured estimate respective a particular calculated estimate of the shortest reflection distance is derived.

3. A The passive terrain navigation arrangement according to claim 2, wherein the probability distribution is a conditional probability function.

4. The passive terrain navigation arrangement according to claim 1, wherein it comprises a barometer-based altimeter adapted to register an altitude measure in relation to the mean sea level, the inertial measurement unit being adapted to receive the altitude measure, and based thereon, calibrate its measurements of the relative spatial movement.

5. A passive navigation method comprising:
registering a relative spatial movement,
receiving an earth-reflected satellite signal from at least one reference signal source whose position is known,
deriving a measured estimate of a shortest reflection distance to the at least one reference signal source based on the received earth-reflected satellite signal,
retrieving surface information pertaining to an elevation of the earth surface in relation to the mean sea level at at least one geographical position,
deriving at least one calculated estimate of the shortest reflection distance to the at least one reference signal source based on the relative spatial movement and the surface information, and
determining a geographical position based on the measured estimate and the at least one calculated estimate.

6. The method according to claim 5, wherein the geographical position is determined on a basis of a probability distribution which describes a probability that the earth-reflected satellite signal is measured at a specific geographical position provided that a particular measured estimate respective a particular calculated estimate of the shortest reflection distance is derived.

7. A The method according to claim 6, wherein the method comprises:
deriving the at least one calculated estimate of the shortest reflection distance with respect to at least two tentative geographical positions,
calculating a probability that the earth-reflected satellite signal is measured at each of said tentative geographical positions, and
determining the geographical position based on the calculated estimate of the shortest reflection distance which is associated with a probability that exceeds a threshold value.

8. The method according to claim 6, wherein the probability distribution is a Bayesian function.

9. A computer readable medium, having a program recorded thereon, where the program is to make a computer control the steps of claim 5.

* * * * *